United States Patent [19]

Hayashi

[11] Patent Number: 4,881,130
[45] Date of Patent: Nov. 14, 1989

[54] IMAGE EDITING SYSTEM FOR AN IMAGE RECORDING APPARATUS WITH THE CAPABILITY OF MARKING AN EDITED IMAGE AREA IN THE FORM OF A VECTOR

[75] Inventor: Tadao Hayashi, Yokohama, Japan

[73] Assignee: Ricoh Company, Ltd., Tokyo, Japan

[21] Appl. No.: 281,027

[22] Filed: Dec. 7, 1988

[30] Foreign Application Priority Data

Dec. 7, 1987 [JP] Japan .................................. 62-307744
Dec. 8, 1987 [JP] Japan .................................. 62-308681
Dec. 8, 1987 [JP] Japan .................................. 62-308683
Oct. 17, 1988 [JP] Japan .................................. 63-259445

[51] Int. Cl.$^4$ ............................................. H04N 1/40
[52] U.S. Cl. .................................... 358/443; 358/447; 358/474; 382/57
[58] Field of Search ................ 358/280, 282, 285, 284; 382/24, 57; 340/709, 739

[56] References Cited

U.S. PATENT DOCUMENTS

| | | | |
|---|---|---|---|
| 4,533,959 | 8/1985 | Zakurai | 358/280 |
| 4,538,183 | 8/1985 | Kanno et al. | 358/280 |
| 4,617,596 | 10/1986 | Yoshida et al. | 358/287 |
| 4,636,870 | 1/1987 | Yamada et al. | 358/280 |
| 4,652,936 | 3/1987 | Hatayama | 358/285 |
| 4,714,918 | 12/1987 | Barker et al. | 340/709 |
| 4,771,336 | 9/1988 | Ohotorii | 358/285 |

FOREIGN PATENT DOCUMENTS 0178581 9/1985 Japan ..................................... 382/57

Primary Examiner—James J. Groody
Assistant Examiner—Kim Yen Vu
Attorney, Agent, or Firm—Oblon, Spivak, McClelland, Maier & Neustadt

[57] ABSTRACT

An image editing system for a digital copier, facsimile apparatus or similar image recoding apparatus having a capability for marking a particular area of a document image. The system allows a document image to be marked not only in a square area but also in an area which is defined by any desired slant line or lines.

3 Claims, 15 Drawing Sheets

Fig. 10A

| INCLI-NATION | ADDRESS | DATA (bin) |
|---|---|---|
| 0 | 0000 ≀ 0009 | 0 ≀ 0 |
| 0.1 | 0010 ≀ 0018 0019 | 0 ≀ 0 00000001 |
| 0.2 | 0020 ≀ 0023 0024 0025 ≀ 0028 0029 | 0 ≀ 0 00000001 0 ≀ 0 00000001 |
| 0.3 | 0030 ≀ | 0 ≀ |
| 1.0 | 0100 ≀ 0109 | 1 ≀ 1 |
| 1.1 | 0110 ≀ 0118 0119 | 1 ≀ 1 00000010 |
| 1.2 | 0120 ≀ 0123 0124 0125 ≀ 0128 0129 | 00000001 ≀ 00000001 00000010 00000001 ≀ 00000001 00000010 |
| 1.3 | 0130 ≀ | 1 ≀ |
| 2.0 | 0200 ≀ 0209 | 00000010 ≀ 00000010 |

Fig. 10B

| | ADDRESS | DATA (bin) |
|---|---|---|
| 2.1 | 0210 ≀ 0218 0219 | 00000010 ≀ 00000010 00000011 |
| 2.2 | 0220 ≀ | 00000010 ≀ |
| 3.0 | 0300 ≀ | 00000011 ≀ |
| 4.0 | 0400 ≀ | 00000100 ≀ |
| 5.0 | 0500 ≀ | 00000101 ≀ |
| 10.0 | 0A00 ≀ | 00001010 ≀ |
| 15.0 | 0F00 ≀ | 00001111 ≀ |
| 15.8 15.9 | 0F08 0F09 | 00001111 00010000 |
| 16.0 | 1000 ≀ | 00010000 ≀ |
| 32.0 | 2000 ≀ | 00100000 ≀ |
| 48.0 | 3000 ≀ | 00110000 ≀ |
| 126.0 | 7E00 ≀ 7E09 | 01111110 ≀ 01111110 |
| 126.1 | 7E10 ≀ 7E18 7E19 | 01111110 ≀ 01111110 01111110 |
| 126.9 | 7E90 7E91 ≀ 7E99 | 01111110 01111111 ≀ 01111111 |
| 127.0 | 7F00 ≀ 7F09 | 01111111 ≀ 01111111 |

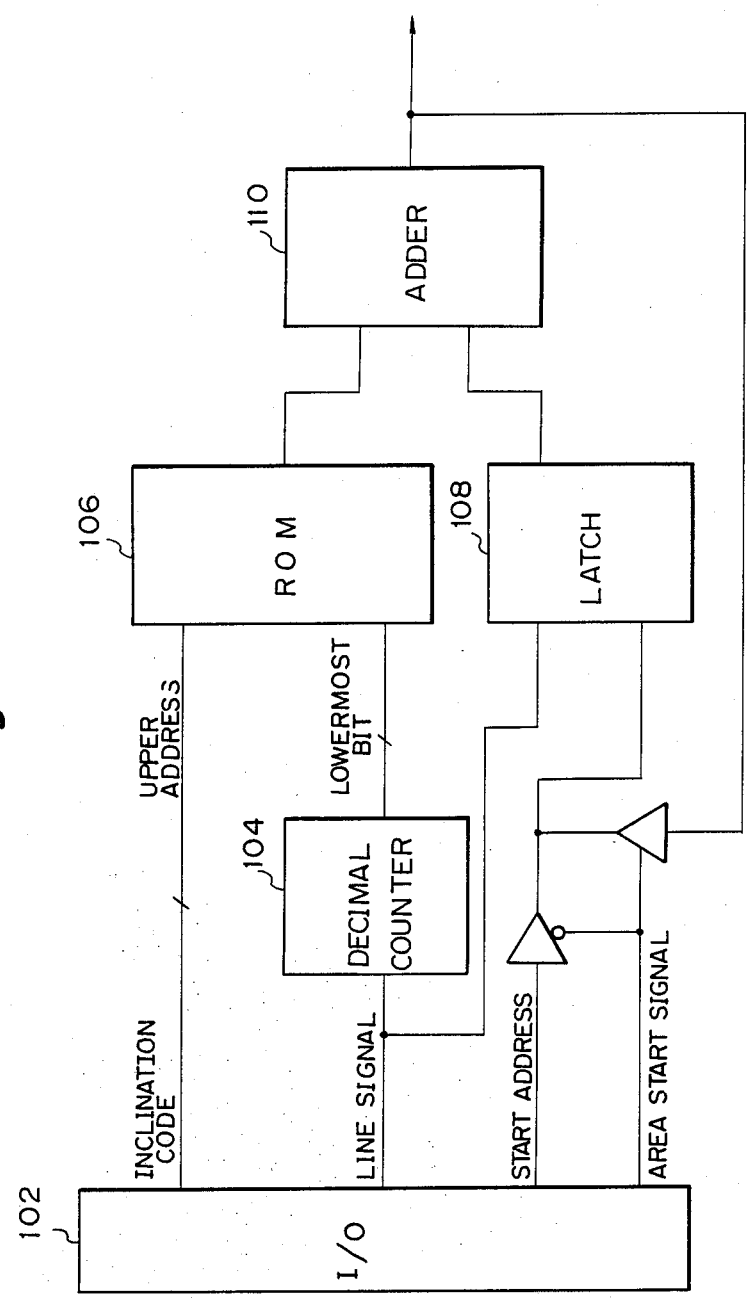

CORRECTION DATA  0 0 0 1 0 0 1 0 0 1

CORRECTION DATA  0 0 0 0 0 0 0 0 1

CORRECTION DATA  0 1 1 1 1 0 1 1 1 1

IMAGE EDITING SYSTEM FOR AN IMAGE RECORDING APPARATUS WITH THE CAPABILITY OF MARKING AN EDITED IMAGE AREA IN THE FORM OF A VECTOR

BACKGROUND OF THE INVENTION

The present invention relates to an image editing system for a digital copier, facsimile apparatus or similar image recording apparatus of the type having a capability for marking a particular area of a document.

A digital copier, facsimile apparatus or similar image recording apparatus capable of marking a desired area of a document is extensively used today. With a prior art image recording apparatus of the type describe, however, it is only a square area that can be marked on a document. More specifically, the method heretofore available is simply marking a square area by two diagonal points or by two parallel lines which extend in the main or subscanning direction. Such prior art approaches cannot meet the increasing demand for a manifold image editing capability.

SUMMARY OF THE INVENTION

It is therefore an object of the present invention to provide an image editing system for an image recording apparatus which allows a document image to be edited in various manners as desired.

It is another object of the present invention to provide an image editing system for an image recording apparatus which allows a document to be marked not only in a square area but also in an area which is defined by a slant line or lines.

It is another object of the present invention to provide a generally improved image editing system for an image recording apparatus.

In accordance with the present invention, an image editing system for an image recording apparatus comprises a marking unit for marking a particular image area being edited by the recording apparatus in the form of a vector, an outputting unit for outputting a difference between area data which are determined on a line basis by an inclination of the vector, a memory for storing the differences, an address setting unit for feeding addresses to the memory, a setting unit for setting a start point of the vector, and a unit for adding the differences stored in the memory to the start point of the vector to produce data of the particular area associated with a main scanning direction.

Also, in accordance with the present invention, an image editing system for an image recording apparatus comprises a marking unit or marking a particular image area being edited by the recording apparatus in the form of a vector, a memory for storing a difference between consecutive lines with respect to area address which is determined by an inclination of the vector, an upper address supplying unit for providing a code representative of an inclination to the memory in the form of an upper address, a lower address supplying unit for providing a lower address for reading added data stored in the memory and associated with any of a plurality of inclinations as needed, an address setting unit for setting an address of a start point of the vector, and a unit for producing data of the area in a main scanning direction by adding outputs of the memory to the address of the start point.

Further, in accordance with the present invention, an image editing system for an image recording apparatus comprises a marking unit for marking a particular image area being edited by the recording apparatus in the form of a vector, an integer portion setting unit for setting an integer portion of an inclination of the vector, a correcting unit for correcting a value of the integer portion of the inclination of the vector on the basis of a value of a real portion (below decimal point) of the inclination, a start point setting unit for setting a start point of the vector, and a unit for producing data of the area in a main scanning direction by adding or subtracting a value representative of an inclination and produced by the integer portion setting unit and correcting unit to or from the value representative of the start point produced by the start point setting unit.

BRIEF DESCRIPTION OF THE DRAWINGS

The above and other objects, features and advantages of the present invention will become more apparent from the following detailed description taken with the accompanying drawings in which:

FIGS. 10A and 10B show data stored in a read only memory in association with various inclinations of a vector;

FIG. 11 is a schematic block diagram showing a specific construction of a part of the system shown in FIG. 9;

DESCRIPTION OF THE PREFERRED EMBODIMENTS

Figure 1:
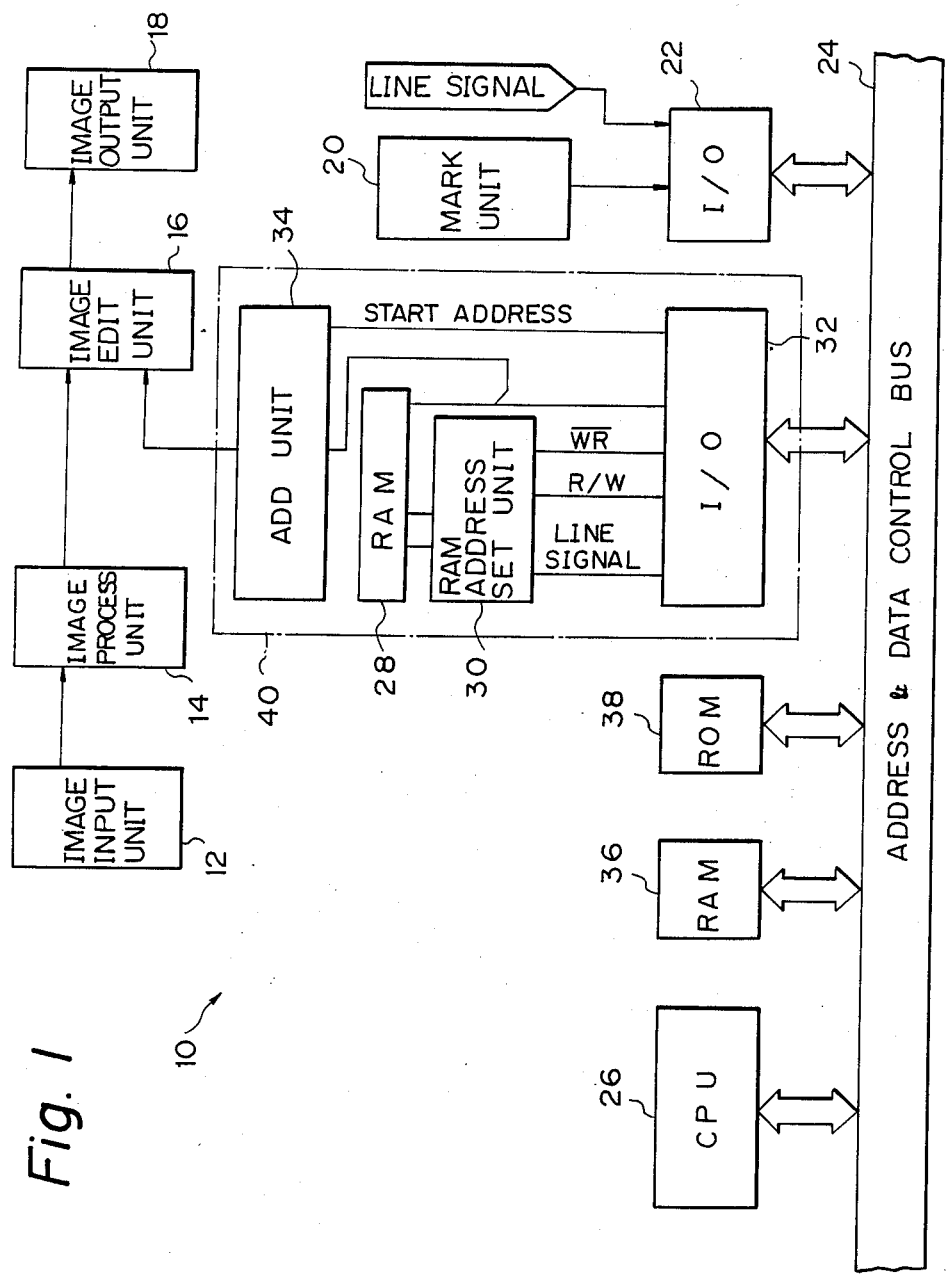
FIG. 1 is a schematic block diagram showing an image editing system embodying the present invention.

Referring to FIG. 1 of the drawings, an image editing system embodying the present invention is shown and generally designated by the reference numeral 10. In the figure, an image inputting unit 12 serves to supply the system 10 with image data. The image inputting unit 12 may be implemented by a scanner which produces image data by use of CCDs (Charge Coupled Devices) or similar photoelectric transducers or by a device of the kind reading data out of a magnetic storage or the like. Image data from the image inputting unit 12 are applied to an image processing unit 14 which performs various kinds of image processing such as gamma correction, edge accentuation, smoothing, tone processing and, if the image data are color image data, complementary color generation and color correction. The processed data from the image processing unit 14 are fed to an image editing unit 16 having a trimming function, masking function, erasing function, shifting function, combining function and other image editing functions. With any of such editing functions, it is possible to mark a particular area of a document image and edit either the outside or the inside of the marked area as desired. The edited image data are printed out by an image outputting unit 18.

An area data inputting unit or marking unit 20 is provided for entering a mark command and data associated with the mark command in the form of a vector and an address representative of the start point of the vector. Alternatively, both of the start point and the end point of a vector or the start point and the component or relative address of a vector may be entered. This allows a particular area of a document to be marked not only by lines which are parallel in the main or subscanning direction but also by a slant line or lines. Such area data are fed from an input/output (I/O) port 22 to a central processing unit (CPU) 26 over an address and data control bus 24. The CPU 26 determines the start address and the inclination of the vector on the basis of the input area data and writes in a random access memory (RAM) 28 added data (when the gradient is positive) or subtracted data (when the gradient is negative) of addresses on a line-by-line basis. The data stored in the RAM 28 are read out while a print-out operation is under way, and the read address of the RAM 28 is advanced every time a line signal arrives at a RAM address setting unit 30. By this procedure, the added or subtacted data of line-by-line addresses are read out. Further, a value of the start address of the vector with respect to the main scanning direction is delivered from an I/O port 32. An adding unit 34 adds an output of the RAM 28 to the start address which is fed from the I/O port 32, every time a line signal arrives at the adding unit 34. The resulting sum data are sequentially fed to the image processing unit 16 in the form of area data. A RAM 36 is adapted to store variables which are necessary for the CPU 26 to execute programs and arithmetic operations, while a read only memory (ROM) 38 is adapted to store those data of the programs and variables which do not need updating.

Figure 2A:
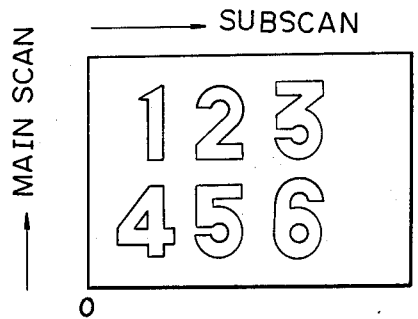
FIGS. 2A and 2B exemplarily show image editing which is implemented by the principle of the present invention.
Figure 2B:
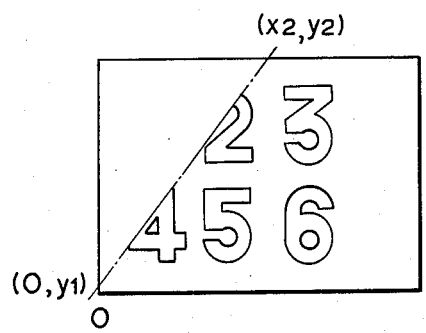

As shown in FIGS. 2A and 2B, assume that the start address (x,y) of a vector is (0,$y_1$) for the simplicity of description. Here, x and y are respectively representative of the number of scanning lines as counted from 0 (zero) in the subscanning direction and the number of output dots as counted from 0 in the main scanning direction. Also assume that the end address (x,y) of the vector is ($x_2,y_2$). Further, let it be assumed that an operator desires to erase the whole area above the line which is defined by such two addresses. FIGS. 2A and 2B show respectively a document and a copy on which edited image data associated with the document are printed out. The data $x_2$, $y_1$ and $y_2$ entered on the marking unit 20 are fed to the CPU 26. In response, the CPU 26 determines an inclination a of the vector by dividing ($y_1-y_2$) by $x_2$ and, from the inclination a, data $S_n$ which is expressed as:

$$S_o = 0$$

$$S_n = int(n \times a - S_{n-1}) \quad (n=1, 2, 3, \ldots) \qquad \text{Eq. (1)}$$

In the Eq. (1), int (b) is representative of an integer portion of b, i.e. a value produced by omitting the figures below the decimal point. $S_n$ is the added or subtracted address data which is derived from the preceding line.

The CPU 26 writes the data $S_n$ in the RAM 28 via the I/O port 32, as stated earlier. At this instant, the RAM address setting unit 30 sets the write address of the RAM 28. The CPU 26 has delivered the start address $y_1$ of the area to the adder 34 via the I/O port 32. Hence, as the printing operation begins, the adding unit 34 sequentially adds to the start address $y_1$ the data stored in the read addresses of the RAM 28 which are designated by the RAM address setting unit 30. In this instance, the variable n is dependent upon the desired accuracy of inclination, i.e., $n_{max}=10$ if figures down to the first decimal place are desired and $n_{max}=100$ if figures down to the second decimal place are desired ($n_{max}$ being representative of the maximum value of variable n). This is because $$n_{max} \times a - int(n_{max} \times a) = 0$$

meaning that for $n_{max}$ the inclination does not involve any error within the associated range of accuracy and, therefore, $S_o$ can be used for the added or subtracted data on the "$n_{max}+1$" line. Hence, the RAM address setting unit 30 outputs zero immediately after $n_{max}$.

Figure 3:
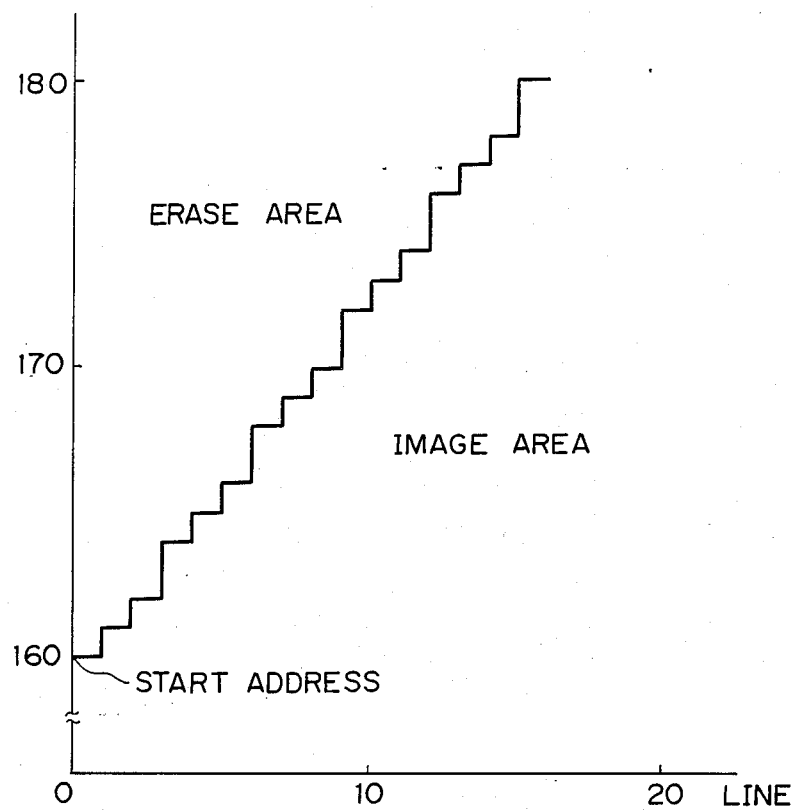
FIG. 3 shows the variation of an area address associated with the image editing of FIGS. 2A and 2B.

FIG. 3 demonstrates the variation of the area address which occurs when $y_1$, $x_2$ and $y_2$ shown in FIGS. 2A and 2B are 20 millimeters, 210 millimeters and 300 millimeters, respectively, and the output dot density d is eight dots per millimeter by way of example.

Figure 4:
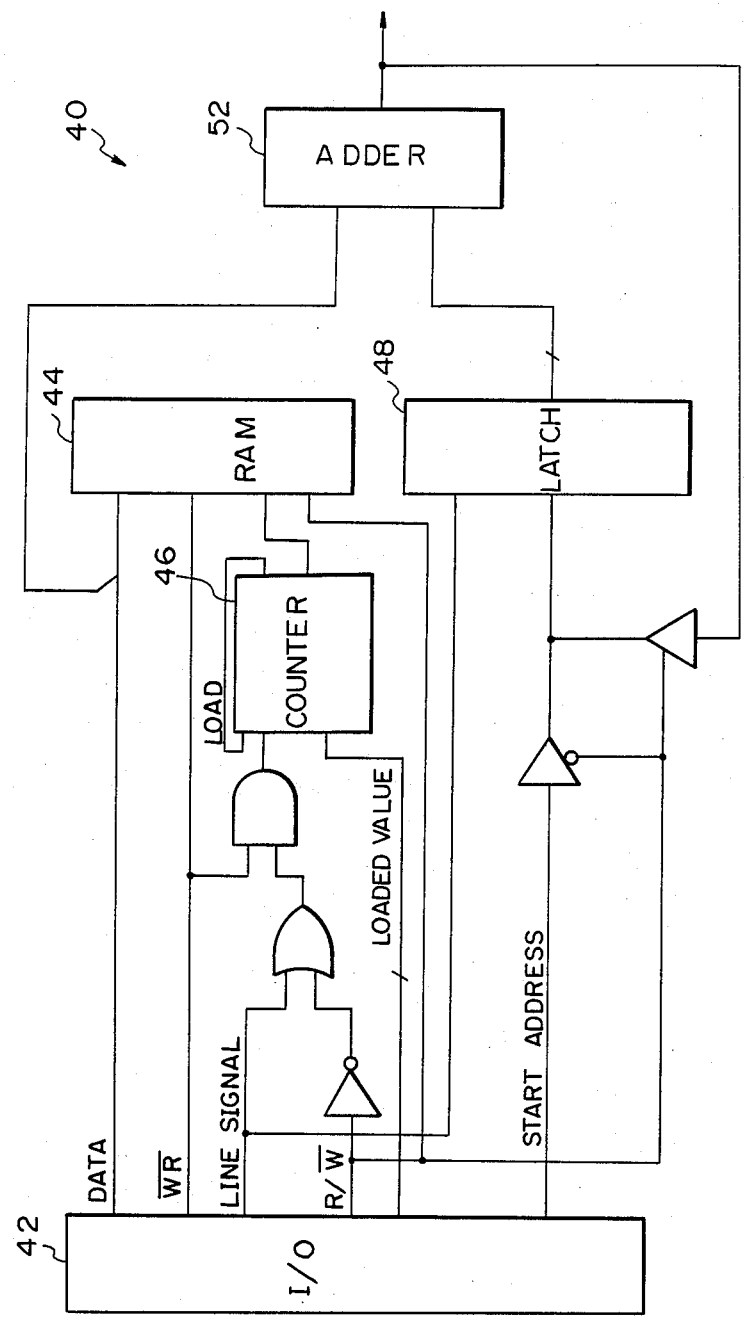
FIG. 4 is a block diagram schematically showing a part of the system shown in FIG. 1.

Referring to FIG. 4, a specific construction of a block 40 shown in FIG. 1 is shown. In the figure, an I/O port 42 delivers an area start address, a line signal, added or subtracted data to be written in the RAM 44, a write enable signal $\overline{WR}$ for writing them in the RAM 44, and a signal $R/\overline{W}$ for controlling the write-in and read-out of RAM data. A counter 46 provides addresses for accessing the RAM 44. More specifically, when the added or subtracted data are to be written in the RAM 44, the counter 46 counts the write enable signals $\overline{WR}$ fed to the RAM 44 and, every time one data is written in, advances the address by one. Conversely, when data are to be read out of the RAM 44, the counter 46 reads out the next data every time the line advances to the next while counting the line signals. The number of terms $n_{max}$ which is dependent upon the accuracy is outputted beforehand via the I/O port 42 and loaded on the counter 46. Where use is made of a down-counter for the counter 46, the counter 46 will sequentially outputs $n_{max}$ to zero. Upon reaching zero, the counter 46 produces a borrow signal to thereby turn its own output to the initially loaded value. The counter 46 repeats such a sequence.

For the above reason, data are sequentially written in the address 0 and the subsequence addresses of the RAM 44, $S_{max}$ of the Eq. (1) first (in practice, reading $S_{max}$ to $S_o$ in this sequence offers the same effect). A latch 48 functions to latch and output data in response to a line signal 50 (FIG. 1). When the signal $R/\overline{W}$ is in a $\overline{W}$ state, a start address is latched by the latch 48 and added by an adder 52. Upon the turn of the signal $R/\overline{W}$ to an R state for reading data out of the RAM 44, the area address of the preceding line, i.e., output of the adder 52 is latched and added to the added or subtracted data in response to every line signal 50.

By the procedure discussed above, area data representative of the slant line shown in FIG. 2B are outputted.

Figure 5:
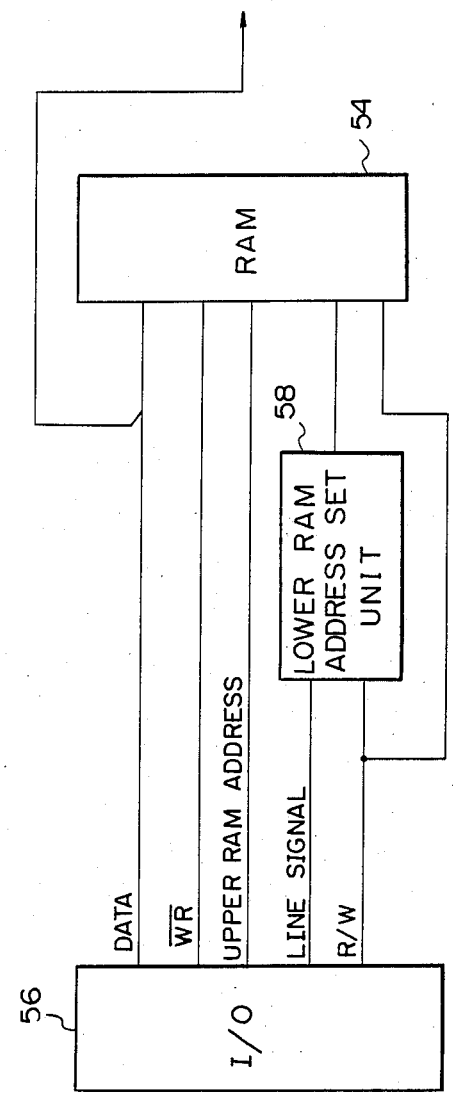
FIG. 5 is a schematic block diagram of a modification to the construction shown in FIG. 4.
Figure 6A:
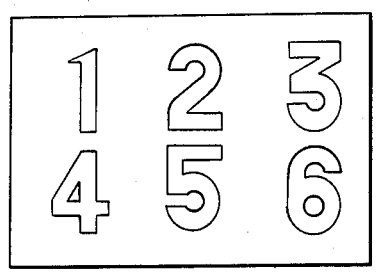
FIGS. 6A and 6B show another example of image editing in accordance with the present invention.
Figure 6B:
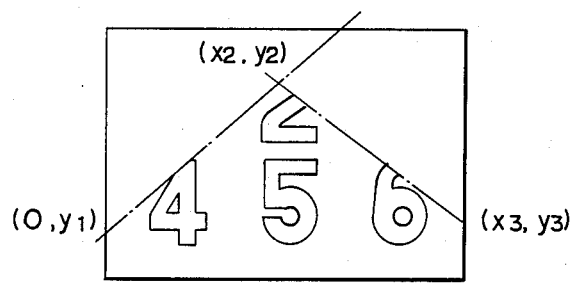

FIG. 5 shows a modification to the construction shown in FIG. 4. In FIG. 5, the I/O port 42, RAM 44 and counter 46 are configured in a block, and an additional signal line is provided for setting the upper RAM address. This alternative configuration is capable of coping with a case wherein the inclination of the marking line is changed midway, as shown in FIGS. 6A and 6B which show respectively a document and a copy of the document. When the added data associated with the vector which interconnects addresses $(0, y_1)$ and $(x_2, y_2)$ are to be written in the RAM 54, the upper address is loaded with 0. Then, when the subtracted data associated with the vector which interconnects the addresses $(x_2, y_2)$ and $(x_3, y_3)$ are to be written, the upper address is loaded with 1. Subsequently, when those data are to be read out of the RAM 54, the upper address of the RAM 54 is loaded with 0 from $x=0$ to $x=x_2$ and with 1 from $x=x_2$ to $x=x_3$, whereby an area with a varying inclination is marked. Even an area involving three or more bends can be marked by using the same principle. Further shown in FIG. 5 are an I/O port 56 and a lower RAM address setting unit 58.

Figure 7:
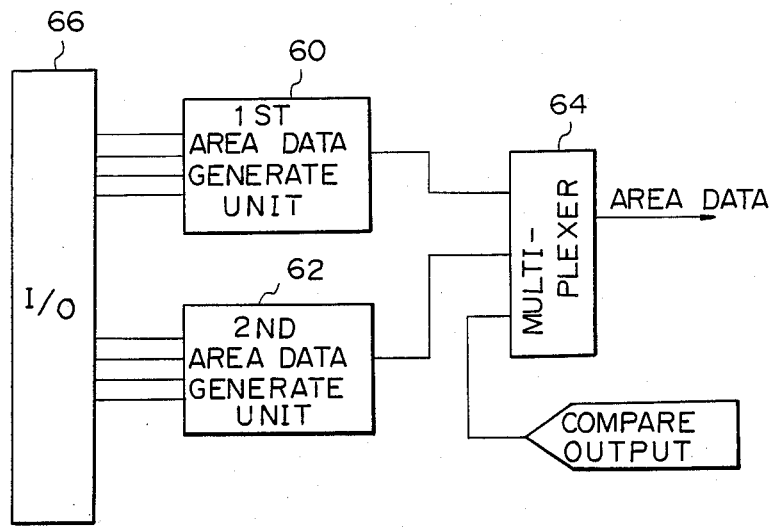
FIG. 7 is a block diagram schematically showing another modification to the construction shown in FIG. 4.
Figure 8:
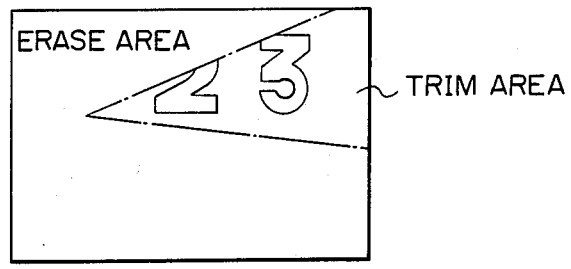
FIG. 8 shows still another example of image editing in accordance with the present invention.

FIG. 7 shows still another modification to the construction shown in FIG. 4. In the figure, the block 40 of FIG. 1 is implemented by a first and a second area data generating subunits 60 and 62. A multiplexer 64 is provided for selectively gating the outputs of the subunits 60 and 62 to produce area data. This kind of construction allows an area to be marked by two slant lines, as shown in FIG. 8. In FIG. 7, the reference numeral 66 designates an I/O port.

Figure 9:
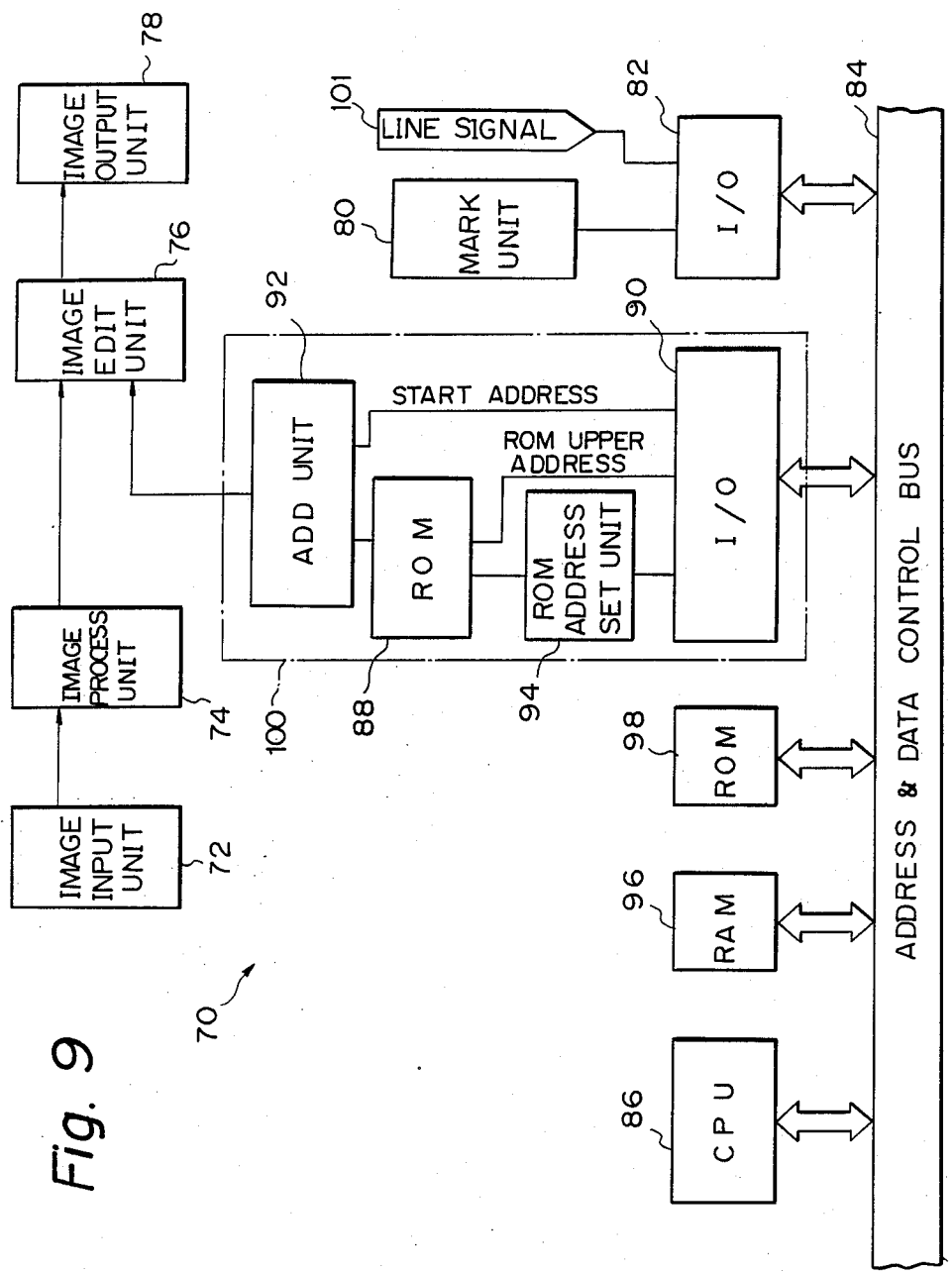
FIG. 9 is a schematic block diagram showing another embodiment of the system in accordance with the present invention.

Referring to FIG. 9, another embodiment of the system in accordance with the present invention is shown. The system, generally 72, includes an image inputting unit 72 which may be implemented by any of the two devices which have been mentioned in relation to the embodiment of FIG. 1. Image data fed from the image inputting unit 72 is routed through an image processing unit 74 to an image editing unit 76 and further to an image outputting unit 78. These units 72, 74 and 76 are substantially identical with the units 14, 16 and 18 of FIG. 1, respectively, as to the functions which they serve.

An area mark command and data associated therewith are entered on an area data inputting unit or marking unit 80 in the form of a vector and the address of the start point of the vector. Alternatively, the start point and the end point of a vector or the start point and the component or relative address of a vector may be entered. This allows an area to be marked not only by parallel lines extending in the main or subscanning direction but also by a slant line or lines. Such area data are fed from an I/O port 82 to a CPU 86 over an address and data control bus 84. In response, the CPU 86 determines the start address and inclination of the vector by arithmetic operations and then feeds an upper address of a ROM 88 associated with the inclination to the ROM 88 via an I/O port 90. Simultaneously, the CPU 86 delivers the start address of the area to an adding unit 92 via the I/O port 90. The ROM 88 stores added data individually associated with line-by-line main scanning addresses for each of different inclinations.

Assume that the inclination a is equal to or greater than $-127.0$ and smaller than $127.0$, and that figures above the first decimal place are desired with repect to accuracy. Then, the ROM 88 are loaded with data shown in FIGS. 10A and 10B. When the inclination a is equal to or greater than $-127.0$ and smaller than 0, it is assumed that 1 is added to the complements of 0 of data associated with any of the inclinations a of FIGS. 10A and 10B the absolute value of which equals that of the determined inclination and, then, the resulting data are written in the inversed addresses of bits 4 to 15. For an inclination a of $-1.1$, for example, "11111111bin (representative of binary number)"is written in FEE0 to FEE8 and "11111110bin" is written in FEE9. The ROM 88 storing such data is supplied with the upper address which is "0560" when the inclination $a$ is 5.6 and "3020" when it is 48.2 by way of example. Then, as the ROM address setting unit 94 sets the lower address of the ROM 88, added data associated with the main scanning addresses of the marked area are outputted by the ROM 88.

The ROM address setting unit 94 counts incoming line signals by the decimal system and constantly produces the varying lowermost bit. This is because the accuracy of inclination involves only the figures above the second decimal place, i.e., the added data vary at the intervals of ten lines. When the figures down to the second decimal place are desired as to the accuracy of inclination, the ROM address setting unit 94 has to repetitively go through counts 0 to 100 and the ROM 88 has to store as many as 100 data for each of various inclinations. A plurality of ROMs 88 may be used to produce the output data in eight or more bits, in which case the inclination a can be selected from a range of $-32767$ to $32767$ which involves the previously mentioned range of $-127.0$ to $127.0$. However, since $\tan^{-1}(127)$ equals 89.5 degrees, it appears that marking an area with an inclination greater than it is not significant in practice and such an inclination should be regarded as a marking line parallel to the main scanning direction and therefore should be dealt with by an operation which is associated with the subscanning direction.

The added data associated with the main scanning addresses of the marked area and the start address of the vector representative of the marked area determined by the above sequence of steps are added line by line by the adding unit 92. Consequently, the outputs of the adding unit 92 are the data representative of the slant line which delimit the two adjacent areas of the document. A RAM 96 and a ROM 98 are respectively identical in function with the RAM 36 and ROM 38 shown in FIG. 1.

Referring to FIG. 11, a specific construction of a block labeled 100 in FIG. 9 is shown. As shown, the block 100 includes an I/O port 102 for delivering values set by the CPU 86. The code representative of an inclination is "012HEX (representative of hexadecimal number)" if the bits 4 to 15 of the addresses shown in FIGS. 10A and 10B, i.e., inclination is 1.2, "20HEX" if it is 32.0, and "3E5HEX" if it is 62.5. A line signal is used for a write start command for each of the lines. Further, a start address is indicative of the address of a start point of a vector which is representative of a marking line with respect to the main scanning direction.

Consider a case wherein a person desires to erase an area of a document above a slant line, as shown in FIGS. 2A and 2B. Assuming that the writing density is d in both of the main and subscanning directions, the start address is $y_1 d$ and the code of the inclination is determined by referencing the data shown in FIGS. 10A and 10B on the basis of the inclination $\alpha = (y_2 - y_1)/x_2$. A counter 104 counts the line signals to produce a decimal value. Hence, values of 0 to 9 are sequentially fed to the lower address of the ROM 88 in response to every line signal. A ROM 106 stores the values shown in FIGS. 10A and 10B and the added data associated with different inclinations of −127.0 to 0, producing added data in response to every line signal. A latch 108 latches the start address while an area start signal from the I/O port 102 has a low level. Upon the turn of the start signal to a high level, the latch 108 latches an output of an adder 110 which is representative of the address of the preceding line in the main scanning direction. Hence, each output of the adder 110 is the sum of the start address and an output of the ROM.

Figure 12:
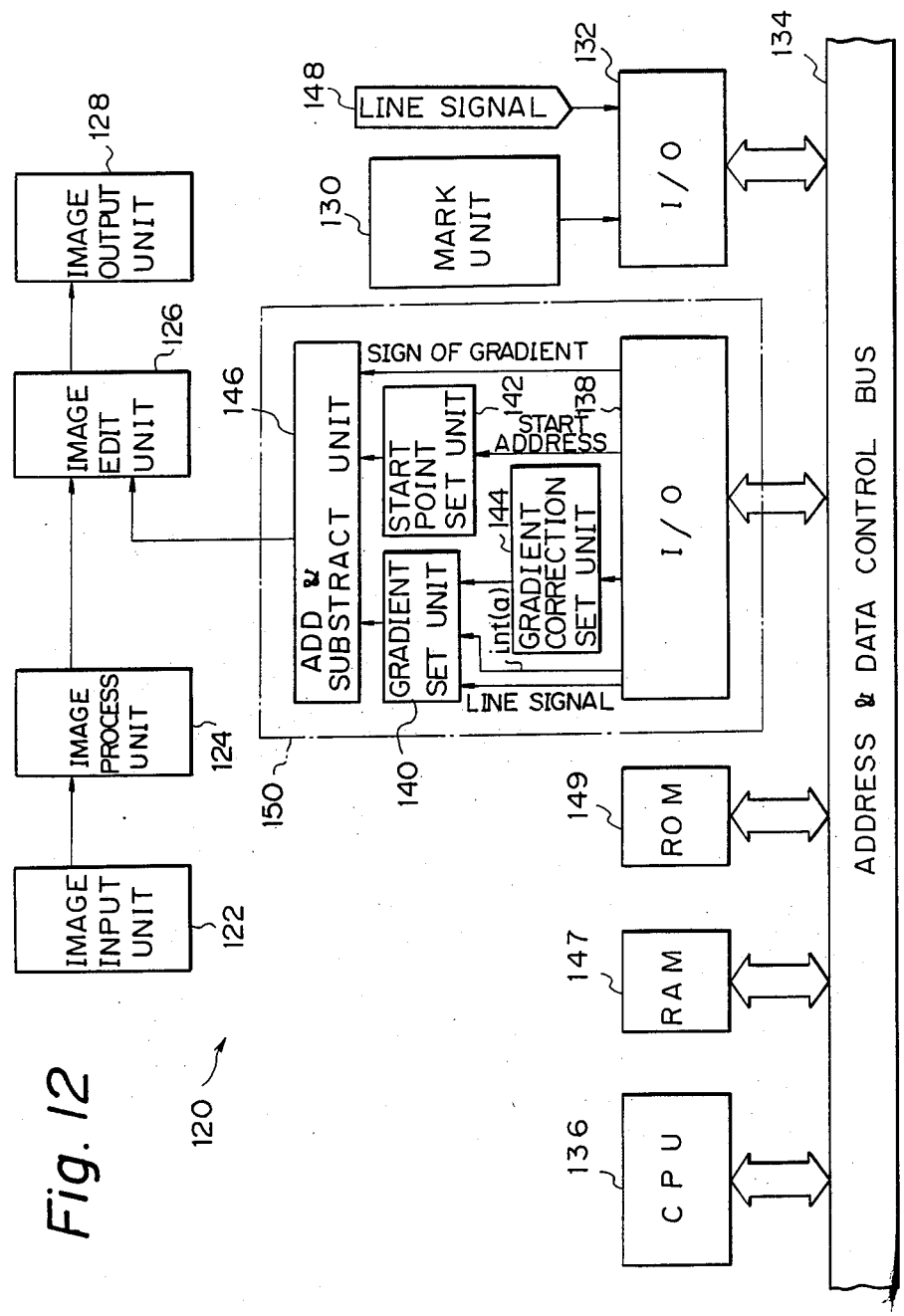
FIG. 12 is a block diagram schematically showing still another embodiment of the present invention.

Referring to FIG. 12, a third embodiment of the present invention is shown. The system, generally 120, includes an image inputting unit 122 which may be implemented by any of the two devices which have been mentioned in relation to the embodiment of FIG. 1. Image data fed from the image inputting unit 122 is routed through an image processing unit 124 to an image editing unit 126 and further to an image outputting unit 128. These units 124, 126 and 128 play substantially the same role as the units 14, 16 and 18 of FIG. 1., respectively.

An area mark command and data associated therewith are entered on an area marking unit 130 in the form of a vector and the address of the start point of the vector. Alternatively, the start point and the end point of a vector or the start point and the component or relative address of a vector may be entered. This allows an area to be marked not only by parallel lines extending in the main or subscanning direction but also by a slant line or lines. Such area data are fed from an I/O port 132 to a CPU 136 over an address and data control bus 134. In response, the CPU 136 determines the start address and inclination of the vector by arithmetic operations and then feeds them to a gradient setting unit 140, a start point setting unit 142, a gradient correction setting unit 144, and an adding and subtracting unit 146.

Again, consider a case wherein the start address (x,y) is $(0, y_1)$, the end address (x,y) is $(x_2, y_2)$, and a person desires to erase the whole area above the marking line defined by the start and end addresses, as shown in FIGS. 2A and 2B. The data $x_2$, $y_1$ and $y_2$ fed from the marking unit 130 are applied to the CPU 136. Then, the CPU 136 determines an inclination $\alpha = (y_2 - y_1)/x_2$. The value $y_1$ and the integer portion int($\alpha$) of $\alpha$ are fed from the I/O port 138 to the start point setting unit 142 and gradient setting unit 140. The adding and subtracting unit 146 adds or subtracts the start address from an output of the gradient setting unit 140 in response to every line signal 148. Thus, an output of the adding and subtracting unit 146 is indicative of a line-by-line address of the marked area. Further fed to the gradient setting unit 140 is output data of the gradient correction setting unit 144. More specifically, this setting unit 140 outputs in response to every line signal a correction value which is determined by a value real ($\alpha$) of a below the decimal point. The gradient setting unit 140 delivers the sum of int ($\alpha$) and the correction value to the adding and subtracting unit 146.

In FIGS. 2A and 2B, assuming that $x_2$, $y_1$ and $y_2$ are 210 millimeters, 20 millimeters and 300 millimeters, respectively, then:

$$\alpha = (300 - 20)/210 = 1.33$$
$$\text{int}(\alpha) = 1, \text{ real}(\alpha) = 0.33$$

Further, assuming that the output dot density d is eight dots per millimeter:

$$\text{Start address } (0, y) = (0, 20 \times d)$$
$$= (0, 160)$$

Since real $(\alpha) = 0.33 = \frac{1}{3}$, outputting a correction value of 1 every third line and a correction value of 0 for the other lines causes the address of the area to change as shown in FIG. 3, i.e., (0, 160), (1, 161), (2, 162), (3, 164), (4, 165), (5, 166), (6, 168) . . . It is to be noted that the inclination is added to the start address when the sign sign ($\alpha$) of the inclination is positive and is subtracted from the start address when it is negative. Consequently, the output of the adding and subtracting unit 146 is 160 for the zero-th line, 161 for the first line, 162 for the second line, 164 for the third line, and so on. Determining that such area data are representative of the border between the two areas, the image editing unit 126 produces image data until the number of output dots as counted from the beginning of each line coincides the area data on that line and, once the former coincides with the latter, produces erase data. Further shown in FIG. 12 are a RAM 147 and a ROM 149 which fullfil the same functions as the RAM 36 and 38 of FIG. 1, respectively.

Figure 13:
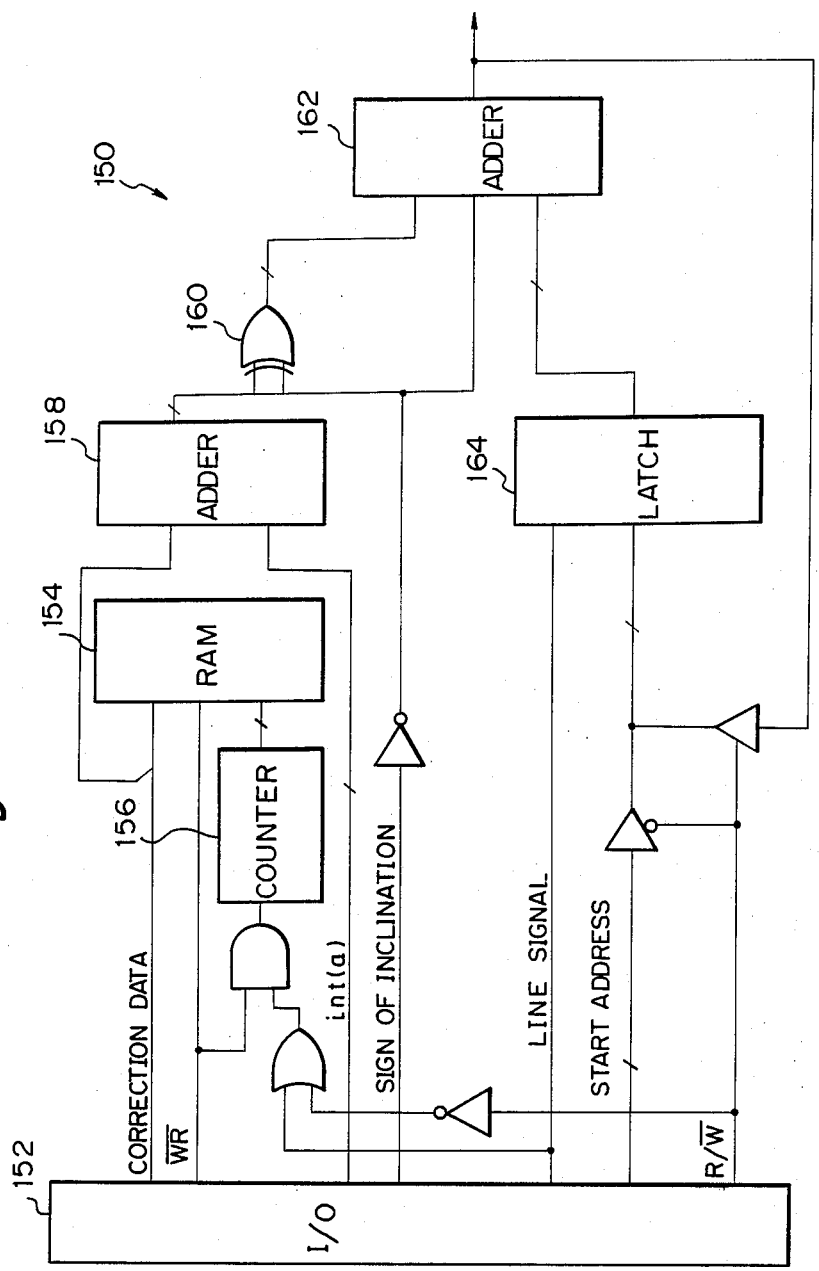
FIG. 13 is a block diagram schematically showing a specific construction of a part of the system shown in FIG. 12.
Figure 14A:
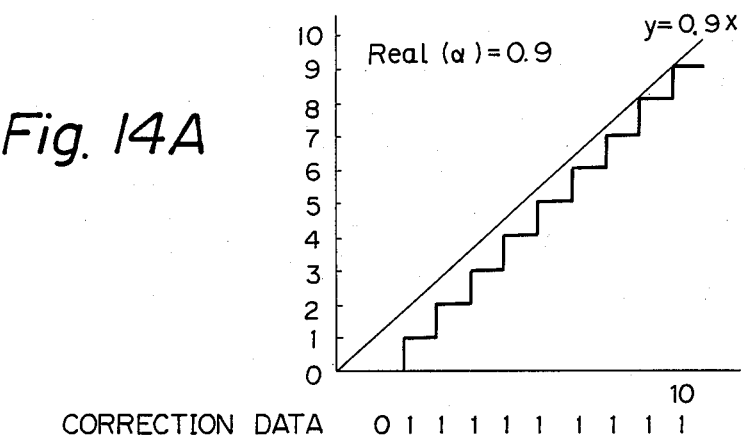
FIGS. 14A to 14I show correction data associated with the embodiment of FIG. 12.
Figure 14B:
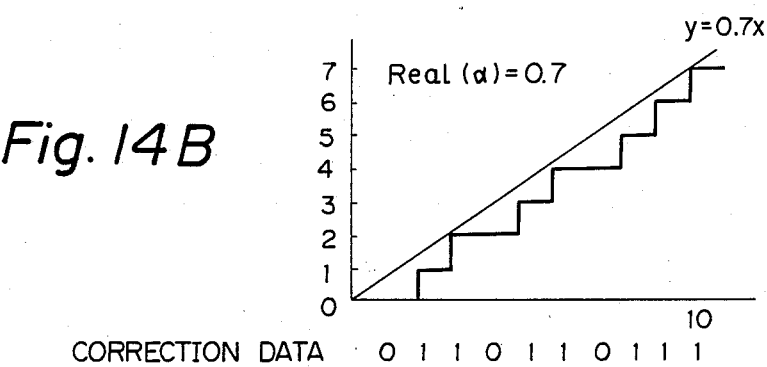
Figure 14C:
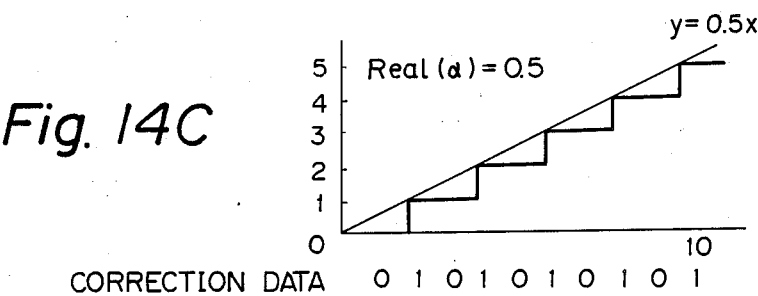
Figure 14D:
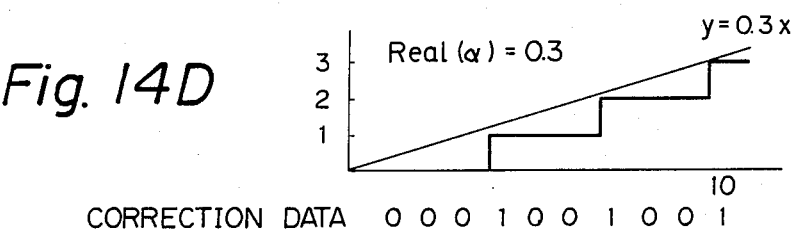
Figure 14E:
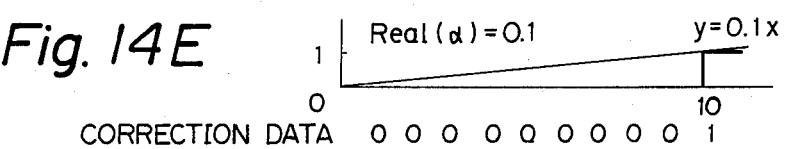
Figure 14F:
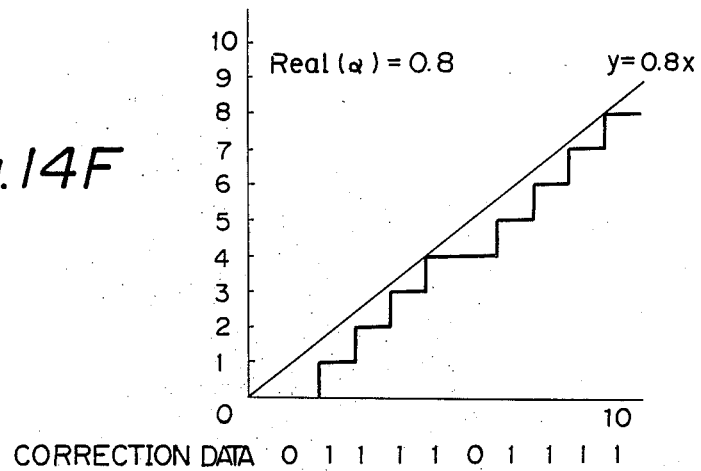
Figure 14G:
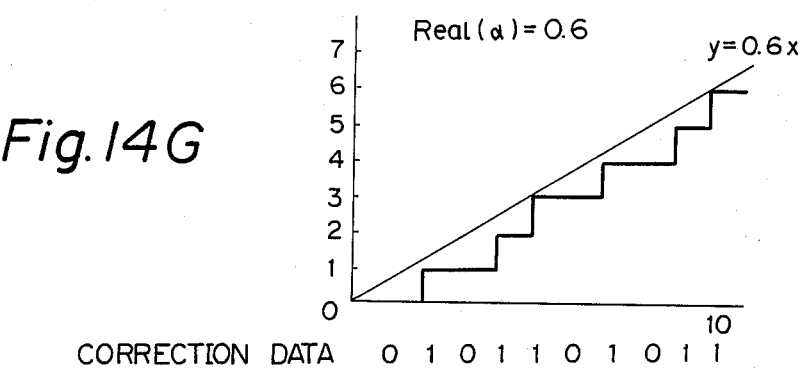
Figure 14H:
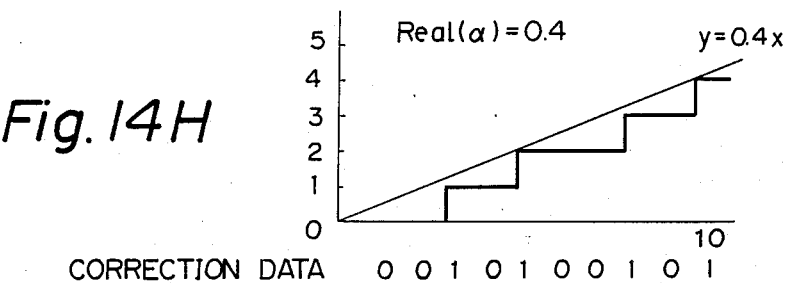
Figure 14I:
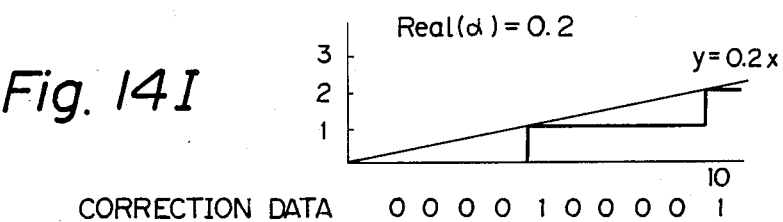

FIG. 13 shows a specific construction of a block 150 which is shown in FIG. 12. In the figure, an I/O port 152 delivers the integer portion int (a) of a start address gradient, the sign of an inclination, a line signal, gradient correction data, a write enable signal $\overline{WR}$ for writing the correction data in a RAM 154, and a signal $\overline{R}/$ for controlling data write-in and data read-out of the RAM 154. A counter 156 is adapted to supply the RAM 154 with addresses and counts the signals $\overline{WR}$ when correction data are to be written in while counting the line signals when they are to be read out. An adder 158 adds the correction data and int ($\alpha$) to determine a difference between the preceding line and the current line as to the address of the area data in the main scanning direction. Since the resulting sum and the inversed version of the sign of the inclination are Exclusive-ORed by an Exclusive-OR gate 160, when the sign of the inclination is negative, the input to an adder 162 has a value produced by subtracting 1 from an inversed version of the output of the adder 158 with respect to the sign. In the adder 162, 1 to be added as mentioned is implemented by the inverted version of the inclination with respect to the sign. A latch 164 latches the start address from the I/O port 152 when correction data are to be written in the RAM 154 and latches output data associated with the preceding line when they are to be read out of the RAM 154. The latched data and a difference between the current line and the preceding line as to the area data are added by the adder 162, whereby the area data delimited by the slant line are produced.

Assuming that the correction of an inclination involves the figures down to the first decimal plate, correction data shown in FIGS. 14A to 14I are adopted on the basis of real $(\alpha) = 0.1, 0.2, \ldots, 0.9$. When it is desired to increase the accuracy of inclination such as to the second decimal place or below, 100 or more values will be adopted. The number of correction data depends upon the accuracy. In the case of correction down to the first decimal place, correction data associated with the tenth line has to be followed by correction data associated with the first line. To meet this requirement, repetitive data may be written in the RAM 154 beforehand or the counter 156 may be caused to output 1 immediately after 10.

By the construction and operation described above, area data having a desired inclination are achieved.

In summary, it will be seen that the present invention provides an image editing system which realizes a manifold and real-time image editing capability.

Various modifications will become possible for those skilled in the art after receiving the teachings of the present disclosure without departing from the scope thereof.

What is claimed is:

1. An image editing system for an image recording apparatus, comprising:
   marking means for marking a particular image area being edited by said recording apparatus in the form of a vector;
   outputting means for outputting a difference between area data which are determined on a line basis by an inclination of the vector;
   memory means for storing the differences;
   address setting means for feeding addresses to said memory means;
   setting means for setting a start point of the vector; and
   means for adding the differences stored in said memory means to the start point of the vector to produce data of the particular area associated with a main scanning direction.

2. An image editing system for an image recording apparatus, comprising:
   marking means for marking a particular image area being edited by said recording apparatus in the form of a vector;
   memory means for storing a difference between consecutive lines with respect to area address which is determined by an inclination of the vector;
   upper address supplying means for providing a code representative of an inclination to said memory means in the form of an upper address;
   lower address supplying means for providing a lower address for reading added data stored in said memory means and associated with any of a plurality of inclinations as needed;
   address setting means for setting an address of a start point of the vector; and
   means for producing data of the area in a main scanning direction by adding outputs of said memory means to the address of the start point.

3. An image editing system for an image recording apparatus, comprising:
   marking means for marking a particular image area being edited by said recording apparatus in the form of a vector;
   integer portion setting means for setting an integer portion of an inclination of the vector;
   correcting means for correcting a value of the integer portion of the inclination of the vector on the basis of a value of a real portion (below decimal point) of said inclination;
   start point setting means for setting a start point of the vector; and
   means for producing data of the area in a main scanning direction by adding or subtracting a value representative of an inclination and produced by said integer portion setting means and said correcting means to or from the value representative of the start point produced by said start point setting means.

* * * * *